US012600458B2

(12) United States Patent
Onodi et al.

(10) Patent No.: US 12,600,458 B2
(45) Date of Patent: Apr. 14, 2026

(54) AIRCRAFT

(71) Applicant: Archer Aviation Inc., San Jose, CA (US)

(72) Inventors: Peter Onodi, Wessling (DE); Adam Smith, Wessling (DE); Chia Hui Lim, Wessling (DE); Inigo Ugarte, Wessling (DE); Benjamin Eduard Wilkosz, Wessling (DE)

(73) Assignee: Archer Aviation Inc., San Jose, CA (US)

( * ) Notice: Subject to any disclaimer, the term of this patent is extended or adjusted under 35 U.S.C. 154(b) by 0 days.

(21) Appl. No.: 18/423,823

(22) Filed: Jan. 26, 2024

(65) Prior Publication Data

US 2024/0270382 A1     Aug. 15, 2024

(51) Int. Cl.
 *B64C 11/00* (2006.01)
 *B64C 29/00* (2006.01)
 *B64D 27/31* (2024.01)

(52) U.S. Cl.
 CPC ........ *B64C 11/001* (2013.01); *B64C 29/0033* (2013.01); *B64D 27/31* (2024.01)

(58) Field of Classification Search
 CPC ............... B64C 11/001; B64C 29/0033; B64C 29/0075; B64D 29/02; B64D 33/02
 See application file for complete search history.

(56) References Cited

U.S. PATENT DOCUMENTS 3,900,178 A  *  8/1975  Tupolev ................. B64D 33/02
                                                        244/55
4,012,013 A  *  3/1977  Ball ......................... B64C 3/48
                                                        137/15.1
(Continued)

FOREIGN PATENT DOCUMENTS

EP          3998214 A       5/2022

OTHER PUBLICATIONS

European Search Report for Application No. 23156103.6 dated Jul. 5, 2023, 7 pages.
(Continued)

*Primary Examiner* — Joshua J Michener
*Assistant Examiner* — Michael B. Kreiner
(74) *Attorney, Agent, or Firm* — Finnegan, Henderson, Farabow, Garrett & Dunner, LLP

(57) ABSTRACT
An aircraft includes at least two propulsion units being pivotable and arranged adjacent to each other along an arrangement direction. The propulsion units include a propulsion rotor and a duct for guiding air to the rotor. The duct has a non-circular inlet portion, a circular downstream portion located downstream of the inlet portion along the airflow direction, and an air guiding portion guiding air from the non-circular inlet portion to the circular downstream portion and establishing the transition therebetween. The air guiding portion has upper and lower portions. The aircraft further includes at least one septum interposed between rotation axes of two adjacent propulsion rotors. The septum extends on the upstream side along the airflow direction with respect to the circular downstream portion and between the upper and lower air guiding portions and has a guiding surface having at least one tangential plane parallel to the rotation axis.

18 Claims, 4 Drawing Sheets

(56) References Cited

U.S. PATENT DOCUMENTS

| | | | | |
|---|---|---|---|---|
| 5,082,206 | A * | 1/1992 | Kutschenreuter, Jr. ...................... | B64C 30/00 |
| | | | | 60/768 |
| 6,050,527 | A * | 4/2000 | Hebert ................... | B64C 23/00 |
| | | | | 244/209 |
| 10,464,668 | B2 * | 11/2019 | Evulet ................... | B64D 27/20 |
| 10,814,989 | B2 * | 10/2020 | Vessot ................... | B64D 27/12 |
| 10,926,874 | B2 * | 2/2021 | Giannini ................... | B64C 5/16 |
| 11,387,693 | B2 * | 7/2022 | Hennig .............. | F04D 29/5806 |
| 11,492,099 | B2 * | 11/2022 | Cummings ............ | B64D 27/40 |
| 11,866,183 | B2 * | 1/2024 | Gonidec ............... | B64D 27/20 |
| 11,939,052 | B2 * | 3/2024 | Van Der Meer ....... | B64D 27/24 |
| 2017/0203839 | A1 | 7/2017 | Giannini et al. | |
| 2022/0018309 | A1 * | 1/2022 | Wylie ................... | B64C 11/001 |
| 2022/0144422 | A1 * | 5/2022 | Welcel ................... | B64D 27/24 |
| 2022/0242583 | A1 | 8/2022 | Gonidec et al. | |
| 2022/0266979 | A1 * | 8/2022 | Bansal ...................... | B64C 9/38 |
| 2022/0266998 | A1 * | 8/2022 | Moebius ............... | B64D 27/18 |
| 2023/0249833 | A1 * | 8/2023 | Zaid ....................... | B64D 27/34 |
| | | | | 244/134 C |
| 2024/0002034 | A1 * | 1/2024 | Moore ............... | B64C 29/0066 |

OTHER PUBLICATIONS

International Search Report and Written Opinion for International Application No. PCT/EP2024/053307, dated Apr. 2, 2024, 10 pages.

* cited by examiner

AIRCRAFT

PRIORITY CLAIM

This application claims the benefit of the filing date of European Patent Application Serial No. EP23156103.6, filed Feb. 10, 2023, for "AIRCRAFT," the disclosure of which is incorporated herein in its entirety by this reference.

TECHNICAL FIELD

The present disclosure relates to an aircraft.

BACKGROUND

In the prior art, for example, EP 3998214 A1, it is known to arrange a plurality of propulsion units in an array along the wing span of an aerial vehicle. The propulsion units are pivotable about a transversal axis of the aircraft. Each propulsion unit comprises a propulsion rotor, in particular, a fan, which generates thrust. In addition, a duct is provided that guides air to the fan.

In arrays of propulsion units being arranged along an arrangement direction, a duct may be designed such that it comprises a non-circular inlet portion, which receives, for example, a free air stream, and a circular downstream portion that is substantially circular about a rotation axis of the propulsion rotor and is located downstream of the inlet portion. In addition, an air guiding portion may be provided to establish the transition between the non-circular inlet portion and the circular downstream portion. The air guiding portion may have an upper and a lower air guiding portion, which are spaced apart from each other and provided on an upper and lower sides of the rotation axis, respectively.

In such an aircraft design, there may occur several drawbacks. For example, sound may propagate among the plurality of propulsion units. Furthermore, considering the case that one of the propulsion units, in particular, a propulsion rotor, is not working properly, or is even inactive, there may be considerable thrust loss in an adjacent propulsion unit working properly.

BRIEF SUMMARY

It is thus an object of the present disclosure to increase performance of an aircraft having pivotable propulsion units arranged adjacent to each other.

In order to solve this problem, an aircraft having certain advantageous features is provided.

According to an aspect of the present disclosure, there is provided an aircraft comprising: at least two propulsion units being pivotable provided on the aircraft, preferably about a transversal axis of the aircraft, the propulsion units being arranged adjacent to each other along an arrangement direction and respectively comprising: a propulsion rotor being rotatable about a rotation axis, configured to contribute in thrust generation, and configured to suck air along an airflow direction substantially perpendicular to the arrangement direction; a duct configured to guide air to the propulsion rotor. The duct comprises a non-circular inlet portion, a circular downstream portion being substantially circular about the rotation axis and being located downstream of the inlet portion along the airflow direction, and an air guiding portion guiding air from the non-circular inlet portion to the circular downstream portion and establishing the transition therebetween, the air guiding portion having an upper and a lower air guiding portion that are spaced apart from each other and provided on respective upper and lower sides of the rotation axis.

The present disclosure is particularly characterized by the aircraft further comprising at least one septum, which is interposed between two rotation axes of two adjacent propulsion rotors, preferably at a center therebetween, the at least one septum extending on the upstream side along the air flow direction with respect to the circular downstream portion and between the upper and lower air guiding portions, the at least one septum having a guiding surface having at least one tangential plane parallel to the rotation axis, and preferably perpendicular to the arrangement direction.

According thereto, embodiments of the present disclosure can avoid cross-flow between two adjacent propulsion units in at least one area, in particular, a plane perpendicular to the rotation axis, upstream of the circular downstream portion along the airflow direction. That is, the septum having the guiding surface allows a substantial separation between the airflows of the adjacent propulsion units. The tangential plane parallel to the rotation axis can ensure that the airflow is substantially guided parallel to the rotational axis, which may be substantially aligned with the airflow direction. Thus, the septum has a rather small interaction in the airflow of the propulsion units. The septum may ensure that in at least one plane perpendicular to the rotation axis upstream of the circular downstream portion, a uniform pressure distribution is established. In particular, backflow in case of an inactive propulsion unit may be prevented from affecting the adjacent propulsion unit. Also, sound waves can be substantially prevented from propagating to adjacent propulsion units.

Thus, the septum having the guiding surface can improve the performance in view of thrust with one propulsion unit being inactive, sound burden, and icing, which can be prevented if one propulsion unit is inactive.

If the guiding surface has a tangential plane perpendicular to the arrangement direction, interference with the airflow can be even further suppressed.

Preferably, the at least one septum is connected to the duct.

By the septum being connected to the duct of at least one, preferably both, of the adjacent propulsion units, the septum can pivot together with at least one of the adjacent propulsion units. Thereby, cross-flow can reliably suppressed independently from the orientation of the propulsion unit. In particular, the septum can be formed with the duct in a monolithic way.

According to another aspect, the guiding surface at least partially may have a planar shape, preferably the at least one septum may have a plate shape.

Thereby, interference with the airflow can be further suppressed, and manufacturing efficiency is enhanced. A plate shape corresponds to a shape of the septum having two opposed plane surfaces.

According to still another aspect, the at least one septum at least partially, preferably entirely, may extend up to a leading edge plane of the inlet portion being a plane perpendicular to the air flow direction and comprising at least part of a leading edge of the duct.

By way of this aspect, the separation of the airflows can be provided upstream of the circular downstream portion up to the leading edge plane. Hence, the aforementioned effects can be achieved in an improved manner. In particular, in case of at least one, preferably all, of the propulsion units being pivoted to a hover orientation, and in case of failure of one propulsion unit, thrust loss in an operating propulsion unit can be reduced.

According to still another aspect, the at least one septum may have a non-concave shape, preferably a convex shape, when seen along the arrangement direction, preferably protruding to the upstream side of a leading edge plane of the inlet portion being a plane perpendicular to the air flow direction and comprising at least part of a leading edge of the duct.

By way of this aspect, cross-flow over the leading edge of the septum can be suppressed.

According to still another aspect, the at least one septum at least partially, preferably entirely, may extend up to a length from a propulsion rotor leading edge plane of at least 0.7 and at maximum 1.3 of a length between the propulsion rotor leading edge plane and a leading edge plane of the inlet portion, preferably at least 0.8 and at maximum 1.2 of the length.

Thus, the septum may extend upstream from a propulsion rotor leading edge plane with an appropriate length in order to ensure the aforementioned effects. At the same time, excessive length with respect to the leading edge plane of the inlet portion can be avoided. It is to be noted that the propulsion rotor leading edge plane may be located at the same position as the circular downstream portion or downstream thereof.

Preferably, the propulsion rotor is a fan.

Thus, a large amount of air can be accelerated by the fan, which would cause considerable pressure difference with one of adjacent propulsion units being inactive. Thus, the septum is particularly advantageous in such a configuration.

Preferably, the propulsion rotor is electrically driven.

In this configuration, the propulsion rotor may be driven at high speeds and moments. Thus, providing the septum is particularly advantageous in such a configuration. Further, electricity may be generated by airflow, for example, if the propulsion rotor is driven by a rotary electric machine such as an electric motor.

According to still another aspect, at least part of the propulsion units may be connected to each other to be moveable integrally with each other.

Thus, the septum can be provided between the adjacent propulsion units and the upper and lower air guiding portions thereof over the entire moveable range of the pivoting movement of the propulsion units.

Alternatively or additionally, at least part of the propulsion units are configured to move independently from each other.

Thus, the number of pivoting masses pivoting integrally can be reduced. Even in this configuration, the septum can be provided between the adjacent propulsion units and the upper and lower air guiding portions thereof in at least one orientation of the moveable range of the propulsion units. For example, the septum may be relatively fixed with respect to the adjacent propulsion units, which are pivotable and may have a shape such that it overlaps the gap between the upper and lower air guiding portions along the arrangement direction in at least one orientation, preferably in the hover orientation, of the adjacent propulsion unit. Preferably, the septum is designed such that it overlaps the gap over the entire moveable range of the adjacent propulsion units. It is also possible that the septum is configured such that it is pivotable about an axis parallel to the pivot axis of the adjacent propulsion units and can be controlled such that it is pivoted based on the pivoting movement of the adjacent propulsion units, preferably synchronously with them.

According to still another aspect, the duct may form a flight control surface.

Thus, other forces than thrust such as lift can be provided by the propulsion unit. In such configuration, phenomena such as backflow may also affect lift generation by the flight control surface. In other words, the flight control surface aerodynamics are coupled to the thrust aerodynamics. Thus, providing the septum is particularly advantageous.

According to still another aspect, the propulsion units may be attached to a wing and/or canard, preferably at least partially rearward of the wing and/or canard.

Thus, aerodynamics of the wing and/or canard can be used for advantageous interaction with the thrust aerodynamic, in particular, if the propulsion units are attached rearward of the wing and/or canard.

Preferably, at least part of the inlet portion is arranged to be substantially flush with the wing and/or canard.

Hence, boundary layer ingestion can be used to prevent flow separation from the upper and lower air guiding portions. Flush means, in particular, that in at least one orientation of the propulsion units respective upper surfaces and/or lower surfaces of the wing and/or canard are continuous with respective upper and/or lower surfaces of the duct, or a cord line of the wing and/or canard is continuous with a cord line of the duct, when seen along the arrangement direction.

According to still another aspect, the maximum thickness of the at least one septum may be at least 0.01 and at maximum 0.10 of a diameter of the propulsion rotor, preferably at least 0.03 and at maximum 0.07 of the diameter, even more preferably is 0.05 of the diameter.

Thereby, separation of the airflows of the adjacent propulsion units can be reliably ensured, while interference with the air flows can be maintained small.

According to still another aspect, a septum may be arranged on each side of the rotation axis of one propulsion unit along the arrangement direction.

Thereby, airflow in the propulsion unit can be harmonized. In addition, a propulsion unit may be arranged on each side of the one propulsion unit such that an array of at least three propulsion units may be provided. For each of these propulsion units, even if one of the other propulsion units fails, performance can be ensured.

Alternatively or additionally, one septum may have two guiding surfaces respectively associated to the adjacent propulsion units.

Accordingly, only one septum need to be provided between the rotation axes of two adjacent propulsion units, preferably in an integral, more preferably monolithic manner. That is, one guiding surface may be provided on one side facing a rotation axis of one of the adjacent propulsion units. The other guiding surface may be provided on the opposite side along the arrangement direction facing a rotation axis of the other of the adjacent propulsion units.

Preferably, the aircraft is of a vertical-take-off-and-landing type.

In such a VTOL configuration, relatively high thrust is required in a vertical flight mode such as hover flight since the thrust needs to compensate the gravity force. Thus, phenomena such as cross-flow in case of failure of one propulsion unit are even more likely to occur, and can be reliably suppressed by the septum.

It is preferable that the septum extends between the upper and lower air guiding portions, that is, overlaps with a gap therebetween along the arrangement direction, in at least one orientation, preferably the vertical orientation, of at least one, preferably both, of the adjacent two propulsion units.

Even more preferably, the septum extends between the upper and lower air guiding portion through the entire moveable range of the pivoting movement of the at least one propulsion unit.

The present disclosure further considers a propulsion unit for an aircraft of any of the above aspects, wherein the propulsion unit comprises at least one septum.

Thus, the above effects can be ensured through the entire moveable range.

BRIEF DESCRIPTION OF THE DRAWINGS

The present disclosure will become more apparent by the following detailed description and the accompanying drawings.

DETAILED DESCRIPTION

Figure 1:
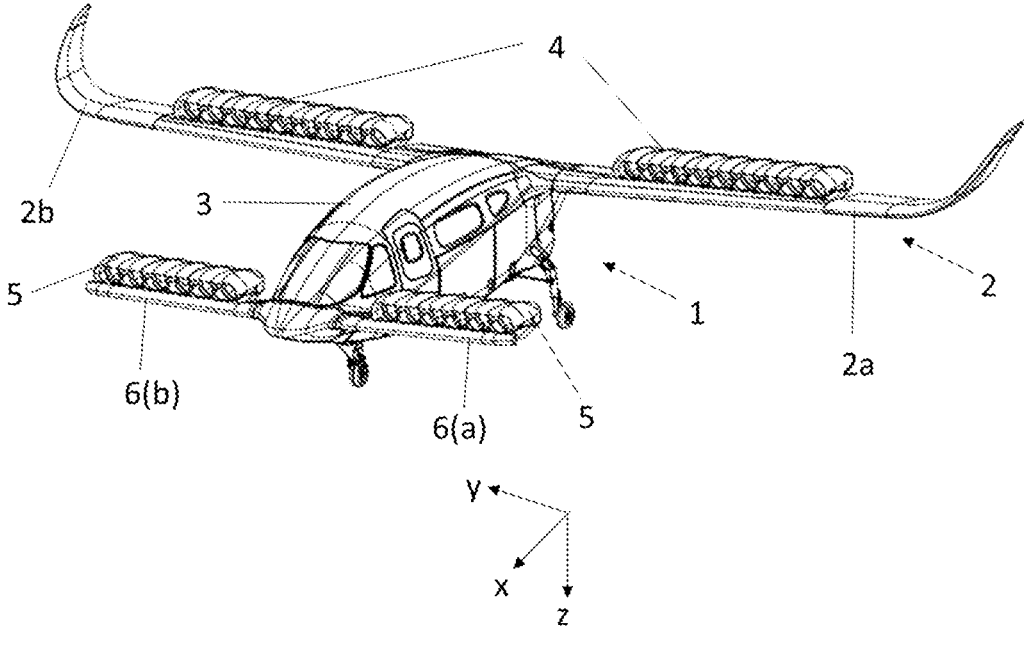
FIG. 1 shows a perspective view of an aircraft to which the present disclosure can be applied.

In the drawings, a longitudinal axis of the aircraft is designated as x-axis. A transversal axis, which extends along the wing span is designated as y-axis, and a vertical axis, which forms an orthogonal right hand system with the x- and y-axis is designated as z-axis.

FIG. 1 shows an aircraft that is designated by reference numeral 1 in perspective view. The aircraft 1 comprises a wing 2. In particular, the aircraft 1 comprises a left wing 2a and a right wing 2b extending on both sides of the x-axis of a fuselage 3, respectively along the y-axis of the aircraft 1.

On both of the left and right wings 2a and 2b, a plurality of propulsion units 4 are attached. The propulsion units 4 are attached to a rear portion, in particular, a rear end portion such as a trailing edge, of the wings 2. The plurality of propulsion units 4 are aligned along the y-axis of the aircraft 1. In particular, the propulsion units 4 are arrayed along an arrangement direction, which is aligned with the y-axis of the aircraft.

The propulsion units 4 are attached to be pivotable about an axis parallel to the y-axis. In particular, the propulsion units 4 are pivotable between a substantially horizontal orientation (cruise flight mode shown in FIG. 1) and a substantially vertical orientation (take-off or hover flight mode). On the wings 2a and 2b, an array of nine propulsion units 4 is provided, respectively.

At least one actuator is provided for each propulsion unit 4 to set the orientation of the propulsion unit 4 with respect to the wing 2. It is to be noted that at least some of the propulsion units 4 of the array of propulsion units 4 may form an integral unit, which is actuated by at least one actuator. However, it is preferable that some, preferably all, propulsion units 4 may be pivoted individually and independently from the others. The propulsion units of each array are preferably pivoted synchronously, that is, there orientation with respect to the wing 2 or canard 6 may be the same.

In addition, the aircraft 1 comprises a canard 6. In particular, a left canard 6a and a right canard 6b are provided to both sides of the x-axis in front of the wings 2a and 2b. Propulsion units 5 are attached to a rear portion, in particular, to a rear end portion such as a trailing edge of the canards 6. The propulsion units 5 are also attached to the canard 6 to be pivotable around an axis parallel to the y-axis. On the canards 6a and 6b, six propulsion units 5 are provided to form an array, respectively.

The propulsion units 5 may be different in configuration, in particular, in terms of size, drive type, and maximum thrust, from the propulsion units 4. Thus, they have different reference signs. The present disclosure may be applied to both of the propulsion units 4 and 5. They may be electrically driven by a rotary electric machine such as an electric motor.

The aircraft 1 is of a vertical-take-off-and-landing type. The propulsion units 4 and/or 5 may thus be configured to pivot at least 90°, preferably 110°.

Figure 2:
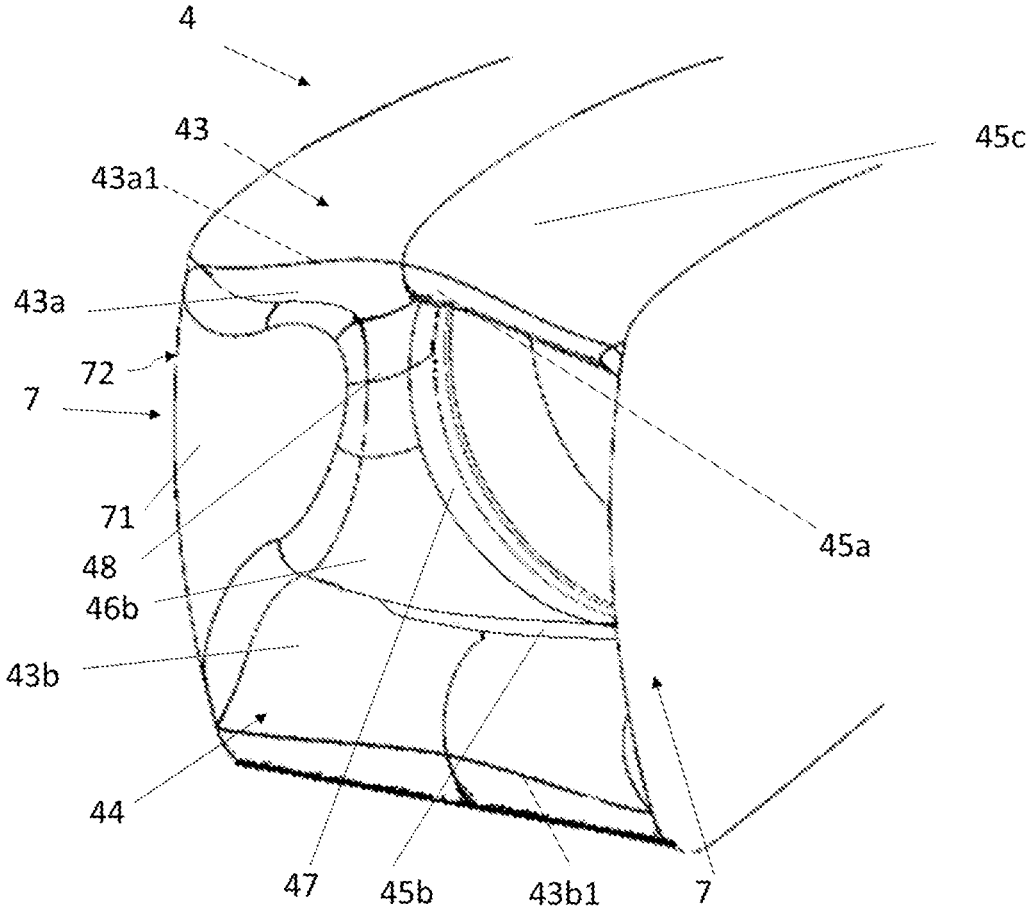
FIG. 2 shows a perspective view of a propulsion unit, which comprises a septum according to the present disclosure.
Figure 3:
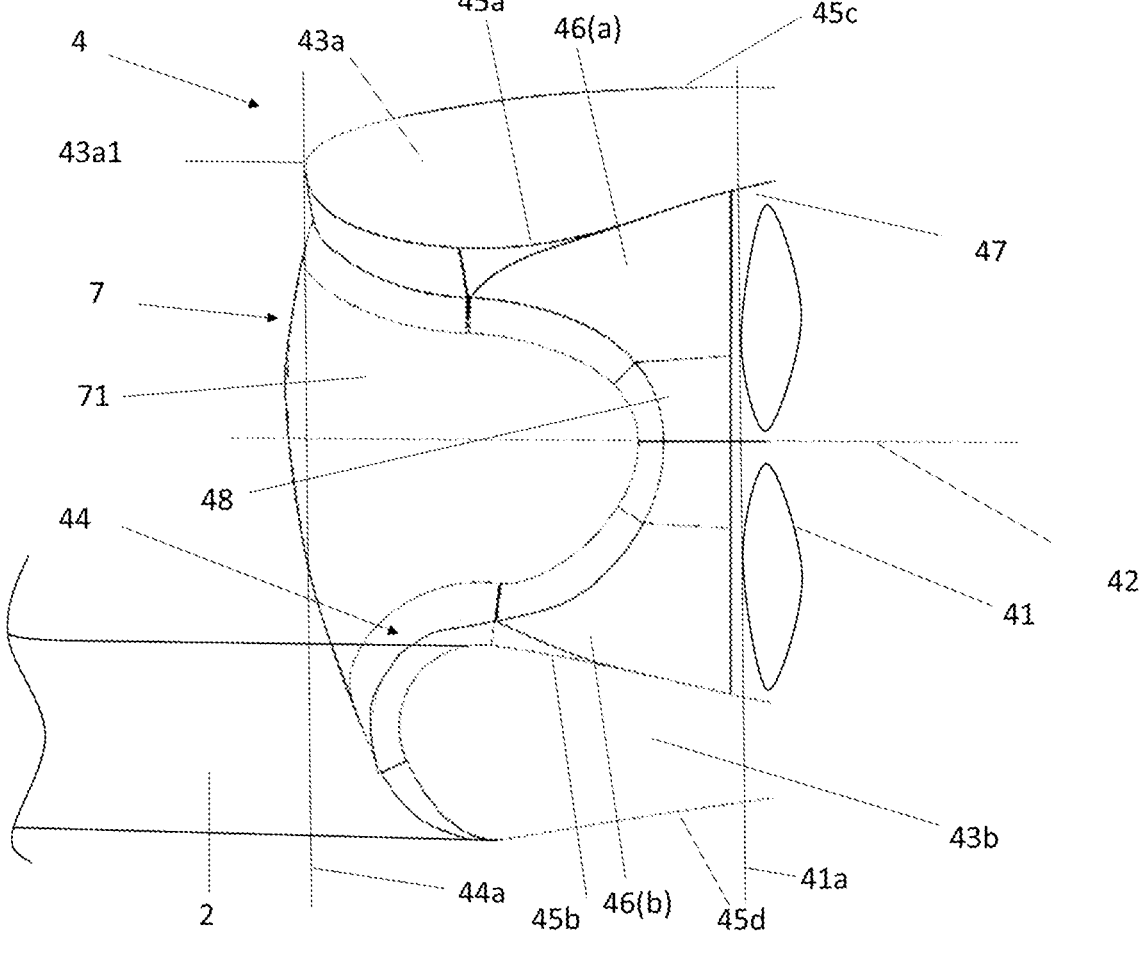
FIG. 3 shows a section along the rotation axis of the propulsion unit of FIG. 2.

Reference is made to FIGS. 2 and 3, which show an exemplary propulsion unit 4. However, the present disclosure may also apply to propulsion unit 5 attached to a canard. As can be taken therefrom, propulsion unit 4 is of a ducted fan type.

In particular, the propulsion unit 4 includes a propulsion rotor 41 (fan). The propulsion rotor 41 can generate a thrust by rotation of the fan about the rotation axis 42 driven by an electric motor. The rotation of the fan 41 sucks air along an airflow direction that is substantially parallel to the rotation axis 42. The rotation axis 42 is also a thrust axis, which is preferably spaced apart from an attachment portion of the propulsion unit 4 at the wing. That is, the thrust axis preferably has a lever arm. In the orientation shown in FIG. 1, the airflow direction is substantially aligned with the x-axis. It is to be noted that in hover flight, the airflow direction may be aligned with the z-axis.

The fan 41 is encompassed by a duct 43. The duct 43 has an upper portion 43a and a lower portion 43b that are spaced apart from each other and opposed to each other along an up-down-direction of the propulsion unit 4, which is perpendicular to the rotation axis 42 and the arrangement direction. The upper portion 43a and the lower portion 43b extend along the arrangement direction, in particular, substantially parallel thereto, and along the rotation axis 42.

Each of the upper and lower portions 43a and 43b has a leading edge 43al and 43b1, respectively, which is located at the most upstream side along the airflow direction. The leading edges 43al and 43b1 are basically provided at the same position along the airflow direction. However, they may also be located at different positions. A leading edge plane is defined as the plane including the most upstream plane including at least part of at least one of the leading edges 43al and 43b1.

The upper and lower portions 43a and 43b form an inlet portion 44 including the leading edges 43al and 43b1. The inlet portion 44 is configured as a two-dimensional inlet by the leading edges 43al and 44al, which extend along the arrangement direction and are spaced apart along an up-down-direction, and respective inner wall surfaces 45a and 45b (the surfaces facing the rotation axis 42) of the upper and lower portions 43a and 43b. The inner wall surfaces 45a and 45b also form an upper air guiding portion 46a and a lower air guiding portion 46b, respectively.

The duct 43 further has a circular downstream portion 47, which is substantially circular around the rotation axis 42 and is formed by the inner wall surfaces 45a and 45b. The circular downstream portion 47 can be considered as one-dimensional inlet for the propulsion rotor 41 since the flow conditions are substantially uniform along the circumference of the circular downstream portion 47.

The upper air guiding portion 46*a* and the lower air guiding portion 46*b* establish the transition from the two-dimensional noncircular inlet portion 44 to the one-dimensional circular downstream portion 47. In particular, the inner wall surfaces 45*a* and 45*b* are provided such that they approach each other in the up-down-direction with increasing distance from the rotation axis 42 and the leading edges 43*al* and 43*b*1, as can be taken from FIGS. 2 and 3 such that they connect to each other at a connection portion 48 downstream of the inlet portion 44 and upstream of the circular downstream portion 47.

In at least one section perpendicular to the arrangement direction, that is parallel to the rotation axis, in particular, in a section including the rotation axis, the duct 43, in particular, the upper and air guiding portions 46*a* and 46*b* may form a divergent portion, in which the inner wall surfaces 45*a* and 45*b* are divergent. Thereby, the static pressure can be increased.

The duct 43 has respective outer wall surfaces 45*c* and 45*d* that are configured such that the propulsion unit 4 forms are flight control surface, in particular, a flap. That is, the duct 43 may form a lift generating body that generates lift by receiving airflow.

Further, a septum 7 is connected to the duct 43. The septum 7 is integrated with the propulsion unit 4. In particular, as can be seen from FIGS. 2 and 3, the septum 7 extends upstream of the circular downstream portion 47 and the connection portion 48. The septum 7, in particular, a guiding surface 71, extends upstream from the connection portion. The septum 7 extends between the upper and lower air guiding portions 46*a* and 46*b* that form a gap therebetween along the up-down-direction. The septum 7 extends such that it connects the upper and lower air guiding portions 46*a* and 46*b* without a gap. The septum 7 extends continuously upstream with respect to the airflow direction.

As can be taken from FIG. 2, the septum 7 has a substantially plate shape. That is, the septum has the guiding surface 71 facing the rotation axis 42 that is planar. The guiding surface 71 has an entirely planar shape. The plane of the guiding surface 71 is perpendicular to the arrangement direction and parallel to the rotation axis 42. Consequently, the septum 7 has a guiding surface 71 having a tangential plane parallel to the rotation axis 42.

The septum 7 also has an outer guiding surface 72 that is also planar and extends parallel to the guiding surface 71 but faces away from the rotation axis 42. The outer guiding surface 72 extends parallel to guiding surface 71. The guiding surface 71 extends up to the leading edges 43*al* and 43*b*1, and even projects upstream therefrom in a region overlapping the rotation axis 42 when seen along the arrangement direction.

The septum 7 has a convex shape, as can be taken from FIG. 3, when seen along the arrangement direction.

The duct 43 may comprise, preferably be formed of, the same material as the septum 7. Duct 43 and/or septum 7 may comprise or be formed of light metal (such as aluminum), light metal alloys, fiber reinforced plastics (such as CFK), for example.

Advantageous effects of the above embodiment are specified below.

The aircraft 1 has the array of propulsion units 4 or 5, which are arranged side by side along the arrangement direction. In such a configuration the two-dimensional inlet portion 44 is beneficial in terms of aerodynamics and space requirements. The circular downstream portion 47 is provided for aerodynamic reasons of the propulsion rotor 41. Consequently, an air guiding portion 46 is provided having the upper and lower air guiding portions 46*a* and 46*b* establishing a continuous transition from the inlet portion 44 to the circular downstream portion 47.

The aircraft 1 further comprises at least one septum 7, which is interposed between two rotation axes 42 of two adjacent propulsion rotors 41, preferably at a center therebetween. The at least one septum extends on the upstream side along the air flow direction with respect to the circular downstream portion 47 and between the upper and lower air guiding portions 46*a* and 46*b*, the at least one septum 7 having a guiding surface 71 having at least one tangential plane parallel to the rotation axis 42, and perpendicular to the arrangement direction. In particular, the guiding surface 71 has a tangential plane parallel to the rotation axis at any location on the guiding surface 71.

According thereto, cross-flow between two adjacent propulsion units 4 in at least one area, in particular, a plane perpendicular to the rotation axis, upstream of the circular downstream portion 47 along the airflow direction can be avoided. That is, the septum 7 having the guiding surface 71 allows a substantial separation between the airflows of the adjacent propulsion units 4. The tangential plane parallel to the rotation axis 42 can ensure that the airflow is substantially guided parallel to the rotation axis 42, which may be substantially aligned with the airflow direction. Thus, the septum 7 has a rather small interaction in the airflow of the propulsion units. Thus, the septum 7 having the guiding surface 71 can improve the performance in view of thrust with one propulsion unit being inactive, sound burden, and icing, which can be prevented if one propulsion unit is inactive.

By the guiding surface 71 having a tangential plane perpendicular to the arrangement direction, interference with the airflow can be even further suppressed. It is to be noted that the tangential plane may not be perpendicular to the arrangement direction but may form other angles therewith.

It is to be noted that at least the guiding surface 71, preferably the septum 7, at least partially, preferably entirely, has preferably a smooth shape, that is, is a smooth surface. A smooth surface is a surface having a well-defined normal vector at each point of the surface. Further preferably, the guiding surface 71, preferably the septum 7, has no protrusions, recesses, holes or the like. This is beneficial for a low airflow interaction.

The at least one septum 7 is connected to the duct 43. It is to be noted that the septum 7 can also be connected to the duct of the adjacent propulsion unit 4. Then, the two propulsion units 4 may be an integral unit.

By the septum 7 being connected to the duct of at least one, preferably both, of the adjacent propulsion units 4, the septum can pivot together with at least one of the adjacent propulsion units. Thereby, cross-flow can reliably suppressed independently from the orientation of the propulsion unit 4.

The guiding surface 71 at least partially, preferably entirely, has a planar shape and the at least one septum 7 has a plate shape.

Thereby, interference with the airflow can be further suppressed, and manufacturing efficiency is enhanced. A plate shape corresponds to a shape of the septum having two opposed plane surfaces such as the surfaces 71 and 72. It is to be noted that the guiding surface 71 may have other shapes than a planar shape. For example, the guiding surface may be curved, for example, the guiding surface may be curved in a convex or concave shape when seen along the rotation axis 42.

As can be taken from FIG. 3, the at least one septum 7 at least partially, preferably entirely, extends up to the leading edge plane 44*a* of the inlet portion being a plane perpendicular to the air flow direction and comprising at least part of a leading edge 43*al* and 43*b*1 of the duct 43.

By way of this aspect, the separation of the airflows can be provided upstream of the circular downstream portion 47 up to the leading edge plane 44*a*. Hence, the aforementioned effects can be achieved in an improved manner. However, the septum 7 may not extend up to the leading edge plane 44*a*, but can extend only up to a plane perpendicular to the rotation axis 42 and downstream of the leading edge plane 44*a*.

The at least one septum 7 has a non-concave shape, preferably a convex shape, when seen along the arrangement direction, preferably protruding to the upstream side of a leading edge plane 44*a* of the inlet portion 44.

By way of this aspect, cross-flow over the leading edge of the septum 7 can be suppressed.

The at least one septum 7 at least partially, preferably entirely, may extend up to a length from a propulsion rotor leading edge plane 41*a*, which is shown in FIG. 3 and includes the most upstream portion of a propulsion rotor blade, of at least 0.7 and at maximum 1.3 of a reference length, preferably at least 0.8 and at maximum 1.2 of the reference length. The reference length may be a length between the propulsion rotor leading edge plane 41*a* and the leading edge plane 44*a* of the inlet portion.

Thus, the septum may extend upstream from a propulsion rotor leading edge plane 44*a* with an appropriate length in order to ensure the aforementioned effects. At the same time, excessive length with respect to the leading edge plane of the inlet portion can be avoided.

In case of the propulsion unit 4 being located rearward and being able to be flush with another lift generating body such as the wing 2 in the cruise flight mode, as it is shown in FIG. 3, the reference length may be determined by the propulsion rotor leading edge plane 41*a* and a leading edge plane of the other lift generating body.

It is particularly beneficial, that at least the guiding surface, preferably the septum is morphable, preferably with respect to its length, its thickness, its thickness distribution, the shape of its guiding surface, and/or curvature of its leading edge, etc. That is, in case of horizontal orientation and the duct being flush with the wing or canard, the length may be longer, as specified above, than in a vertical orientation of the propulsion unit. To this end, the septum may have a margin length that is displaceable or deployable, and is accommodated, for example, in the duct in a retracted state.

The propulsion rotor 41 is a fan.

Thus, a large amount of air can be accelerated by the fan 41, which would cause considerable pressure difference with one of adjacent propulsion units 4 being inactive. Thus, the septum 7 is particularly advantageous in such a configuration.

The propulsion rotor 41 is electrically driven.

In this configuration, the propulsion rotor 41 may be driven at high speeds and moments. Thus, providing the septum 7 is particularly advantageous in such a configuration. Further, electricity may be generated by airflow, for example, if the propulsion rotor 41 is driven by a rotary electric machine such as an electric motor.

The duct 43 forms a flight control surface.

Thus, other forces than thrust such as lift can be provided by the propulsion unit 4. In such configuration, phenomena such as backflow may also affect lift generation by the flight control surface. In other words, the flight control surface aerodynamics are coupled to the thrust aerodynamics. Thus, providing the septum 7 is particularly advantageous.

As can be taken from FIG. 3, at least part of the inlet portion 44 is arranged to be substantially flush with the wing 2 and/or canard 6 in at least one orientation of the propulsion unit 4, in particular, the hover orientation, preferably through all orientations. In FIG. 3, the inner upper wall surface 45*b* and the outer lower wall surface 45*d* are arranged to be flush, that is, continuous without a step when seen along the arrangement direction with the upper and lower surfaces of the wing 2.

Hence, boundary layer ingestion can be used to prevent flow separation from the upper and lower air guiding portions.

The septum is a thin wall member, the maximum thickness thereof may be at least 0.01 and at maximum 0.10 of a diameter of the propulsion rotor 41, preferably at least 0.03 and at maximum 0.07 of the diameter, even more preferably is 0.05 of the diameter. This applies, in particular, if the adjacent propulsion units 4 are not integrated with each other and each of the propulsion units 4 adjacent to each other has a septum 7 at least on the side between the respective rotation axes. In case the adjacent propulsion units 4 are integrated to each other and only one septum is provided between the two rotation axis, or in case a relatively fixed septum 7 is provided, the aforementioned values for the thickness can be doubled.

Thereby, separation of the airflows of the adjacent propulsion units can be reliably ensured, while interference with the airflows can be maintained small.

As shown in FIG. 2, a septum 7 is arranged on each side of the rotation axis 42 of one propulsion unit 4 along the arrangement direction.

Thereby, airflow in the propulsion unit 4 can be unified. In addition, a propulsion unit 4 may be arranged on each side of the one propulsion unit 4 such that an array of at least three propulsion units 4 may be provided. For each of these propulsion units 4, even if one of the other propulsion units fails, performance can be ensured. It is to be noted that a septum may be provided between each of two adjacent propulsion axes of one array of propulsion units.

The septum 7 has two guiding surfaces 71 and 72 respectively associated to the adjacent propulsion units 4. This applies, in particular, if the adjacent propulsion units are integrated with each other.

Accordingly, only one septum need to be provided between the rotation axes of two adjacent propulsion units, preferably in an integral, more preferably monolithic manner. That is, one guiding surface 71 may be provided on one side facing a rotation axis 42 of one of the adjacent propulsion units 4. The other guiding surface 72 may be provided on the opposite side along the arrangement direction facing a rotation axis of the other of the adjacent propulsion units 4.

The aircraft 1 is of a vertical-take-off-and-landing type.

In such a VTOL configuration, relatively high thrust is required in a vertical flight mode such as hover flight since the thrust needs to compensate the gravity force. Thus, phenomena such as cross-flow in case of failure of one propulsion unit are even more likely to occur, and can be reliably suppressed by the septum.

It is preferable that the septum 7 extends between the upper and lower air guiding portions 46*a* and 46*b*, that is, overlaps with a gap therebetween along the arrangement direction, in at least one orientation, preferably the vertical orientation, of at least one, preferably both, of the adjacent two propulsion units 4. Even more preferably, the septum 7 extends between the upper and lower air guiding portions 46a and 46b through the entire moveable range of the pivoting movement of the at least one propulsion unit.

It is to be noted that at least one septum 7 may be provided on each side of the longitudinal axis of the aircraft 1, preferably in a symmetric manner. Thus, airflow on both sides of the aircraft can be harmonized. It is to be noted that the aircraft 1 is symmetric with respect to the x-axis in terms of the arrangement of wings, canards and/or propulsion units.

Figure 4:
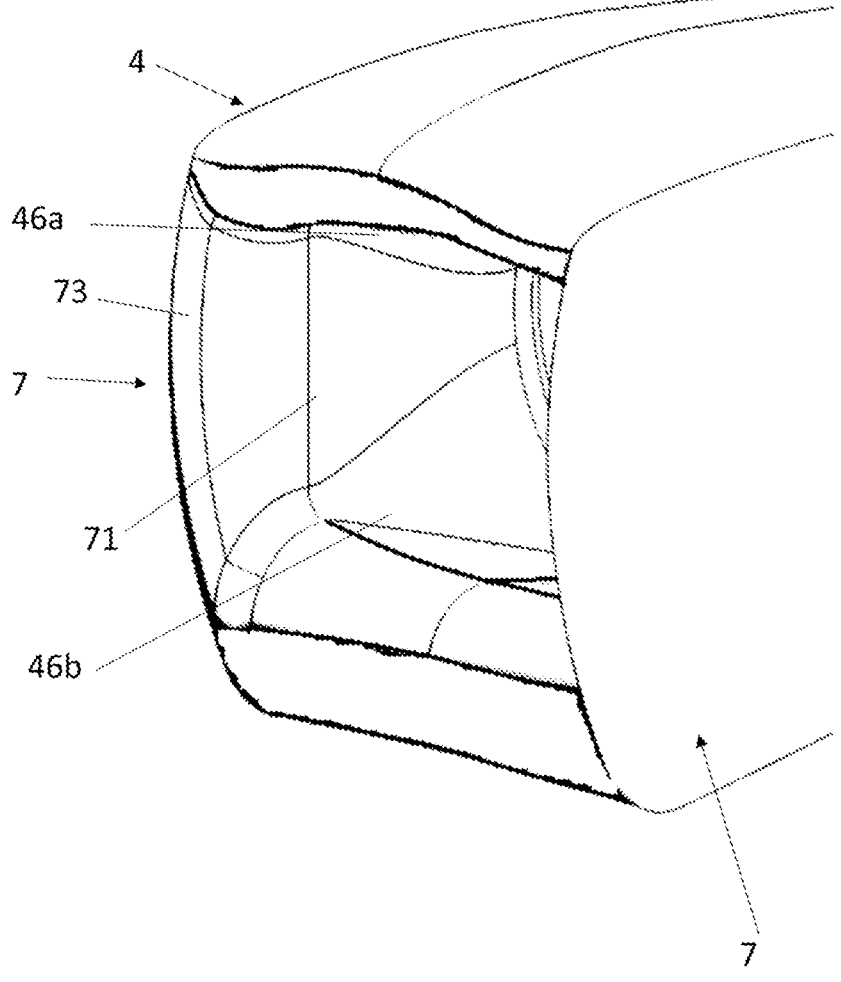
FIG. 4 shows a modification of the propulsion unit having a septum.

FIG. 4 shows a modification of the propulsion unit 4 of the above embodiment having basically the same elements as the above embodiment. In this modification, the septum 7 includes an upstream end surface 73, which is formed in a curved shape in a section perpendicular to the up-down-direction and provided on an upstream end of the guiding surface 71. That is, the upstream end portion 73 terminates in a septum leading edge. This allows for better flow along the septum 7. Furthermore, in the modification, the transition provided by the upper and lower air guiding portions 46a and 46b is established slightly different. While in the embodiment, the upper and lower air guiding portions 46a and 46b have an intersection point, in the modification, the upper and lower air guiding portions 46a and 46b do not have such intersection point.

In a further modification, the septum 7 may be provided fixed at the wing 2 and/or canard 6 and/or any other attachment object. That is, the septum 7 may be relatively fixed with respect to two adjacent propulsion units 4 and/or 5.

Alternatively or additionally, a septum 7 may be provided pivotable, preferably about the same axis, to the attachment object of the propulsion units 4 and/or 5, and may be controlled to pivot in synchronization with the adjacent propulsion units 4 and/or 5. If the septum 7 is not connected to at least one of the ducts of the adjacent propulsion units, in particular, not provided integrally therewith, it is preferable that at least one of the adjacent propulsion units, preferably both, in particular, the ducts thereof, contact the respective guiding surface in an airtight manner over, preferably the entire, moveable range. In other words, the adjacent propulsion units may make sliding contact with the septum.

In a further modification, the septum, in particular, the guiding surface, may extend directly from a front end of the circular downstream portion to the upstream side.

Instead of the fan, the propulsion rotor may be a compressor, for example. In other words, the propulsion unit 4 need not be of a ducted fan type.

In the present disclosure, the term "at least" comprises the entirety of the respective items but also comprises merely the specified amount, unless otherwise specified.

What is claimed is:

1. An aircraft, comprising:
at least two propulsion units being pivotable provided on the aircraft, the propulsion units being arranged adjacent to each other along an arrangement direction and respectively comprising:
   a propulsion rotor being rotatable about a rotation axis, configured to contribute in thrust generation, and configured to suck air along an airflow direction substantially perpendicular to the arrangement direction; and
   a duct configured to guide air to the propulsion rotor, the duct comprising a non-circular inlet portion, a circular downstream portion being substantially circular about the rotation axis and being located downstream of the inlet portion along the airflow direction, and an air guiding portion guiding air from the non-circular inlet portion to the circular downstream portion and establishing a transition therebetween, the air guiding portion having an upper and a lower air guiding portion spaced apart from each other and provided on respective upper and lower sides of the rotation axis; and
at least one septum interposed between two rotation axes of two adjacent propulsion rotors, the at least one septum extending on the upstream side along the airflow direction with respect to the circular downstream portion and between the upper and lower air guiding portions, the at least one septum having a guiding surface having at least one tangential plane parallel to the rotation axis, wherein the at least one septum protrudes to an upstream side of a leading edge plane of the inlet portion,
wherein the at least one septum at least partially extends up to a maximum length of 1.3 times a reference length, the reference length being a length between a propulsion rotor leading edge plane and the leading edge plane of the inlet portion.

2. The aircraft of claim 1, wherein the at least one septum is connected to the duct.

3. The aircraft of claim 1, wherein the guiding surface at least partially has a planar shape.

4. The aircraft of claim 3, wherein the at least one septum has a plate shape.

5. The aircraft of claim 1, wherein the at least one septum at least partially extends up to a leading edge plane of the inlet portion, the leading edge plane being a plane perpendicular to the air flow direction and comprising at least part of a leading edge of the duct.

6. The aircraft of claim 1, wherein the at least one septum has a non-concave shape when seen along the arrangement direction.

7. The aircraft of claim 1, wherein the propulsion rotor is a fan.

8. The aircraft of claim 1, wherein the propulsion rotor is electrically driven.

9. The aircraft of claim 1, wherein:
at least part of the propulsion units are connected to each other to be moveable integrally with each other; and/or
at least part of the propulsion units are configured to move independently from each other.

10. The aircraft of claim 1, wherein the duct forms a flight control surface.

11. The aircraft of claim 1, wherein the propulsion units are attached to a wing and/or canard.

12. The aircraft of claim 11, wherein at least part of the inlet portion is arranged to be substantially flush with the wing and/or canard.

13. The aircraft of claim 1, wherein the maximum thickness of the at least one septum is at least 0.01 and at maximum 0.10 of a diameter of the propulsion rotor.

14. The aircraft of claim 1, wherein:
a septum is arranged on each side of the rotation axis of one propulsion unit along the arrangement direction; and/or
one septum has two guiding surfaces respectively associated to the adjacent propulsion units.

15. The aircraft of claim 1, wherein the aircraft is a vertical-take-off-and-landing aircraft.

16. The aircraft of claim 1, wherein the at least one tangential plane of the guiding surface is perpendicular to the arrangement direction.

17. An aircraft, comprising:

at least two propulsion units being pivotable provided on the aircraft, the propulsion units being arranged adjacent to each other along an arrangement direction and respectively comprising:

a propulsion rotor being rotatable about a rotation axis, configured to contribute in thrust generation, and configured to suck air along an airflow direction substantially perpendicular to the arrangement direction; and a duct configured to guide air to the propulsion rotor, the duct comprising a non-circular inlet portion, a circular downstream portion being substantially circular about the rotation axis and being located downstream of the inlet portion along the airflow direction, and an air guiding portion guiding air from the non-circular inlet portion to the circular downstream portion and establishing a transition therebetween, the air guiding portion having an upper and a lower air guiding portion spaced apart from each other and provided on respective upper and lower sides of the rotation axis; and at least one septum interposed between two rotation axes of two adjacent propulsion rotors, the at least one septum extending on the upstream side along the airflow direction with respect to the circular downstream portion and between the upper and lower air guiding portions, the at least one septum having a guiding surface having at least one tangential plane parallel to the rotation axis, wherein the at least one septum protrudes to an upstream side of a leading edge plane of the inlet portion, wherein the at least one septum at least partially extends up to a leading edge plane of the inlet portion, the leading edge plane being a plane perpendicular to the air flow direction and comprising at least part of a leading edge of the duct, and wherein the at least one septum extends entirely up to the leading edge plane of the inlet portion.

18. An aircraft, comprising:

at least two propulsion units being pivotable provided on the aircraft, the propulsion units being arranged adjacent to each other along an arrangement direction and respectively comprising:

a propulsion rotor being rotatable about a rotation axis, configured to contribute in thrust generation, and configured to suck air along an airflow direction substantially perpendicular to the arrangement direction; and a duct configured to guide air to the propulsion rotor, the duct comprising a non-circular inlet portion, a circular downstream portion being substantially circular about the rotation axis and being located downstream of the inlet portion along the airflow direction, and an air guiding portion guiding air from the non-circular inlet portion to the circular downstream portion and establishing a transition therebetween, the air guiding portion having an upper and a lower air guiding portion spaced apart from each other and provided on respective upper and lower sides of the rotation axis; and at least one septum interposed between two rotation axes of two adjacent propulsion rotors, the at least one septum extending on the upstream side along the airflow direction with respect to the circular downstream portion and between the upper and lower air guiding portions, the at least one septum having a guiding surface having at least one tangential plane parallel to the rotation axis, wherein the at least one septum protrudes to an upstream side of a leading edge plane of the inlet portion, wherein the at least one septum has a non-concave shape when seen along the arrangement direction, wherein the at least one septum has a convex shape along substantially its entire length when seen along the arrangement direction.

* * * * *